(12) United States Patent
Lin et al.

(10) Patent No.: US 9,262,415 B2
(45) Date of Patent: Feb. 16, 2016

(54) CACHE EFFICIENCY IN A SHARED DISK DATABASE CLUSTER

(71) Applicants: Mei-Lin Lin, Pleasanton, CA (US); Blaine French, Concord, CA (US)

(72) Inventors: Mei-Lin Lin, Pleasanton, CA (US); Blaine French, Concord, CA (US)

(73) Assignee: SYBASE, INC., Dublin, CA (US)

( * ) Notice: Subject to any disclaimer, the term of this patent is extended or adjusted under 35 U.S.C. 154(b) by 179 days.

(21) Appl. No.: 14/075,577

(22) Filed: Nov. 8, 2013

(65) Prior Publication Data

US 2015/0134900 A1    May 14, 2015

(51) Int. Cl.
*G06F 12/08* (2006.01)
*G06F 17/30* (2006.01)

(52) U.S. Cl.
CPC ............ *G06F 17/30* (2013.01); *G06F 12/0815* (2013.01); *G06F 12/0866* (2013.01); *G06F 2212/283* (2013.01)

(58) Field of Classification Search
CPC ............ G06F 12/084; G06F 12/00868; G06F 2212/283; G06F 12/08; G06F 12/0866; G06F 12/0862; G06F 12/0804; G06F 2212/312; G06F 3/061
See application file for complete search history.

(56) References Cited

U.S. PATENT DOCUMENTS

| 5,909,540 | A  | * | 6/1999  | Carter et al. ................. 714/4.4   |
| 5,918,229 | A  | * | 6/1999  | Davis et al. .................. 705/27.1  |
| 7,624,184 | B1 | * | 11/2009 | Aviani et al. ................. 709/227   |
| 7,788,243 | B2 | * | 8/2010  | Pasupuleti et al. ............ 707/704    |
| 7,890,456 | B2 |   | 2/2011  | Hempelmann et al.                        |
| 8,356,007 | B2 |   | 1/2013  | Larson et al.                            |
| 8,397,029 | B2 |   | 3/2013  | Nicholas et al.                          |
| 8,504,542 | B2 | * | 8/2013  | Chang et al. .................. 707/704   |
| 2004/0083341 | A1 | * | 4/2004  | Robinson et al. ............. 711/133  |
| 2005/0131853 | A1 | * | 6/2005  | Sampath et al. .................. 707/1 |
| 2006/0101081 | A1 | * | 5/2006  | Lin et al. ........................ 707/200 |
| 2006/0230391 | A1 | * | 10/2006 | Alexander et al. ............. 717/130  |
| 2006/0259527 | A1 | * | 11/2006 | Devarakonda et al. ....... 707/203      |
| 2008/0021853 | A1 | * | 1/2008  | Modha et al. .................... 706/44  |
| 2008/0065644 | A1 | * | 3/2008  | Pasupuleti et al. .............. 707/10  |
| 2010/0033017 | A1 | * | 2/2010  | Huang ............................ 307/80  |
| 2010/0250857 | A1 | * | 9/2010  | Matsui ........................... 711/133 |
| 2010/0293440 | A1 | * | 11/2010 | Thatcher et al. ............... 714/764  |
| 2011/0010330 | A1 |   | 1/2011  | McCline et al.                          |
| 2011/0153566 | A1 | * | 6/2011  | Larson et al. .................. 707/638 |
| 2011/0231374 | A1 | * | 9/2011  | Jain et al. ........................ 707/692 |

(Continued)

FOREIGN PATENT DOCUMENTS

CN    100487675 C    5/2009

*Primary Examiner* — Jared Rutz
*Assistant Examiner* — Jean Edouard
(74) *Attorney, Agent, or Firm* — Sterne, Kessler, Goldstein & Fox P.L.L.C.

(57) ABSTRACT

Disclosed herein are system, method, and computer program product embodiments for storing and accessing data in a shared disk database system using a timestamp range to improve cache efficiency. An embodiment operates by retrieving, by a node, from a shared storage. a blockmap identity and a root page associated with a data request, based on a determination that the blockmap identity associated with a data request is present in a cache. The embodiment continues, retrieving, by the node, the logical page by copying a stored logical page from the shared storage and setting a lower timestamp value of the logical page to a timestamp associated with the stored logical page and an upper timestamp value of the logical page to a timestamp associated with the data request, based on a determination that the logical page is not present in the cache.

20 Claims, 11 Drawing Sheets

(56) References Cited

U.S. PATENT DOCUMENTS

| | | |
|---|---|---|
| 2011/0289119 A1 | 11/2011 | Hu et al. |
| 2012/0011106 A1 | 1/2012 | Reid et al. |
| 2012/0072652 A1* | 3/2012 | Celis et al. ............... 711/103 |
| 2012/0136839 A1 | 5/2012 | Eberlein et al. |
| 2012/0210041 A1* | 8/2012 | Flynn et al. ............... 711/3 |
| 2012/0278477 A1* | 11/2012 | Terrell et al. ............... 709/224 |
| 2012/0317079 A1* | 12/2012 | Shoens et al. ............... 707/639 |
| 2013/0117307 A1 | 5/2013 | Vishnoi et al. |
| 2013/0117526 A1 | 5/2013 | Florendo |
| 2013/0138626 A1 | 5/2013 | Delafranier et al. |
| 2013/0185508 A1* | 7/2013 | Talagala et al. ............... 711/118 |
| 2013/0198459 A1 | 8/2013 | Joshi et al. |
| 2014/0229767 A1* | 8/2014 | Kang et al. ............... 714/22 |

\* cited by examiner

CACHE EFFICIENCY IN A SHARED DISK DATABASE CLUSTER

BACKGROUND

Nearly all commercial database systems rely on caching techniques to improve performance. Caches are often implemented in memory that can be accessed quickly, such as random access memory (RAM), as opposed to storage that takes longer to access, such as disk-based storage. Caches typically store frequently used data and reduce the time needed by a database system to access a data page.

Database systems that support multiple nodes sharing stored data need to keep track of different versions of the stored data. This is because one node may modify shared data where other nodes require access to the original data. Some designs rely on locking to serialize reading and writing of the shared data, but this can be an inefficient use of resource. Thus, shared disk database systems have been developed that store different versions of data, where reads and writes from separate nodes can execute independent of each other, with each getting the correct data.

In order to handle this, in a system where data structures provide a hierarchical way of identifying pages, either in cache or storage, data structures are associated with version identifiers. Pages in cache are Accessed using the version identifier along with identifying information. In this system, pages in cache can include a version identifier to indicate the associated version of data structure that initially read or created the page in cache. If no version of the page in cache matches the requested version, the correct version of the page is read from disk-based storage into the cache.

In a system where a single cache is used, the version of unchanged pages is shared among all versions of the data structure. Each cached page is associated with a version range, with the lower bound set to the initial version when the page was read or created and the upper bound set to infinity. During a page lookup, if the requested version falls within the version range of a page in cache, that page is returned. Setting upper bound to infinity effectively allows the same page in cache to be shared by all higher versions. When a newer version of a page is created, the previous version of the page in cache is located and the upper bound of its version range is clipped from infinity to new version-1. This allows subsequent page lookup to return correct version of the page, based on whether the requested version falls within the version range of the previously cached page or the newly created page.

Cache retention algorithms allow all higher versions of a data structure to share the same cached page until a new version of the page is created. These work well in a single monolithic database server since all versions of a page are cached in one cache. When a new version of the page is being created in cache, the previous version of the page can be located and the upper bound of its version range can be clipped.

However the same cache retention algorithms do not work in a shared disk database cluster where each node maintains its own cache. When a new version of the page is created and cached in one node, the previous version of the page may be cached in one or more other nodes. Without the ability to locate previous version of the page in local cache to clip the upper bound of its version range when a new version is created, all higher versions of the data structure can no longer share the same unchanged page in local cache. This creates situations where the wrong page can be looked up from cache. For example, if a new version of a page is created in one cache but the previous version existed in a second cache. The old version in the second cache would maintain its upper bound set to infinity. Therefore, if a request came in for the modified page to the second cache after the update was made to the first cache, the second cache would return the wrong version because it was never informed of the change.

To address this issue, a shared disk database cluster must either force a shared disk database to always re-read database page from physical storage when the data structure's version does not match the version of the page in cache or use inter-node messaging to notify other nodes to clip upper bound of version range for the previously cached version when a new version of the page is created. These are both expensive and can result in excessive network I/O's or physical I/O's. The issue can have significant impact on performance, because some small and infrequent DML operations on a table can invalidate all of cached pages of the same table in all nodes.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for storing and accessing data in a shared disk database cluster using timestamp range to improve cache efficiency.

Figure 1:
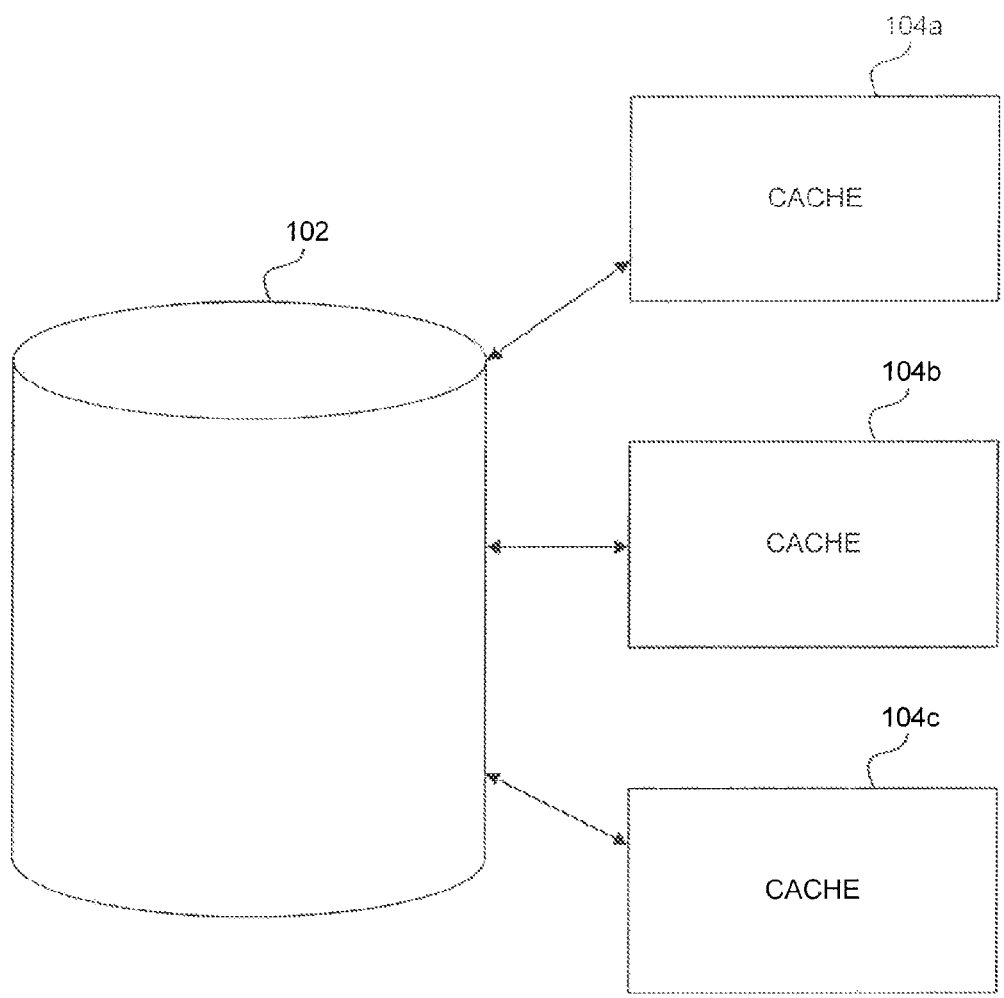
FIG. 1 is a block diagram of a shared disk database system that includes multiple caches in multiple nodes, according to an example embodiment.

FIG. 1 shows a shared disk database system 100 in which embodiments described herein can be implemented. In an embodiment, shared disk database system 100 includes a database 102 coupled to one or more local caches 104. For ease of discussion, three local caches, local caches 104a-104c, have been illustrated, though embodiments could use more or less.

In an embodiment, database 102 and the local caches can include a table that stores blockmap identities. Blockmap identities include a unique blockmap identifier, a timestamp, and a physical block number of a root blockmap page. The timestamp can be a large variable for holding a monotonically increasing value that is incremented each time the blockmap is updated and the change is committed by a transaction. For example this can be a four byte unsigned integer, thus creating a variable that can be used to track over four billion changes. At timestamp 1, the blockmap is in its initial state, and each time the blockmap is updated and the change is committed, the timestamp increments, for example to timestamp 2, then timestamp 3, etc. The database and local caches can also store pages, for example root blockmap pages, blockmap pages, and logical pages.

Illustration of Updating a Blockmap in a Shared Disk Database

Figure 2A:
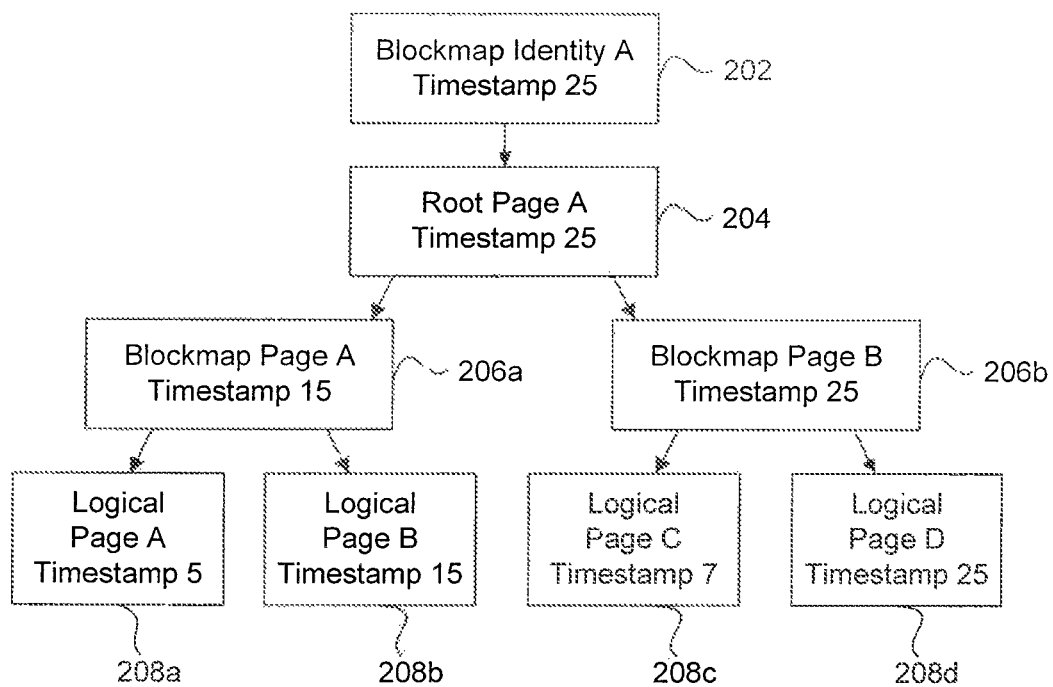
FIGS. 2A-2F are block diagrams of a database in a shared disk database system as it is updated, according to an example embodiment.

FIGS. 2A-2F are block diagrams of a blockmap in a shared disk database system as it is being updated, according to an example embodiment. FIG. 2A illustrates how, in an embodiment, data may look at timestamp 25. FIGS. 2B-2F illustrate how this data may be modified if logical page A is updated at timestamp 26, in an embodiment.

In FIG. 2A, blockmap identity 202 includes a blockmap unique identifier A, a timestamp, and a physical block number of a root page. The timestamp signifies when a blockmap identity 202 was created. The blockmap identity 202 uses the physical block number of a root page to point to an associated root page 204.

In an embodiment, the pages in the blockmap are arranged in a multi-level structure, for example a 1, 2, 3, 4, or more level structure. FIGS. 2A-2F illustrate an embodiment consisting of a two level structure. In this embodiment, the root level, for example root page A, maintains pointers for the blockmap pages at the second level, for example blockmap pages A and B and information for the first set of logical page number to physical block number mappings, and the second level, for example blockmap pages A and B, maintains information for the next two sets of logical page number to physical block number mappings. The logical pages, for example logical pages A, B, C, and D are data pages. For example, root page A 204 may address logical page numbers 0x0000-0x1fff and blockmap page A 206a may address logical page numbers 0x2000-0x3fff and blockmap page B 206b may address logical page numbers 0x4000-0x5ffff. Thus a change in the blockmap page A 206a with a logical page number between 0x2000-0x3ffff would require updates to the root page A 204 and blockmap page 206a, as described below.

In an embodiment, each root page 204 includes a timestamp indicating when the root page was created. The root page points to one or more blockmap pages 206. A root page may also point to one or more logical pages. In an embodiment, the number of pages pointed to by a root or blockmap page can be defined by a fanout number. For example, in FIG. 2A, root page A 204 points to two blockmap pages 206a and 206b, and therefore has a fanout number of 2.

In an embodiment, each blockmap page includes a timestamp, indicating when the blockmap page was created. The blockmap page can point to one or more logical pages 208. For example, in FIG. 2A, Blockmap Page A 206a points to two logical pages 208a and 208b and Blockmap Page B 206b points to two logical pages 208c and 208d. A blockmap page may also point to one of more blockmap pages, if there are blockmap pages at the next level.

In an embodiment, a request to update the blockmap is received. An embodiment clones a blockmap identity 216 from blockmap identity 202 and increments the timestamp of the blockmap identity 216 to 26.

Figure 2B:
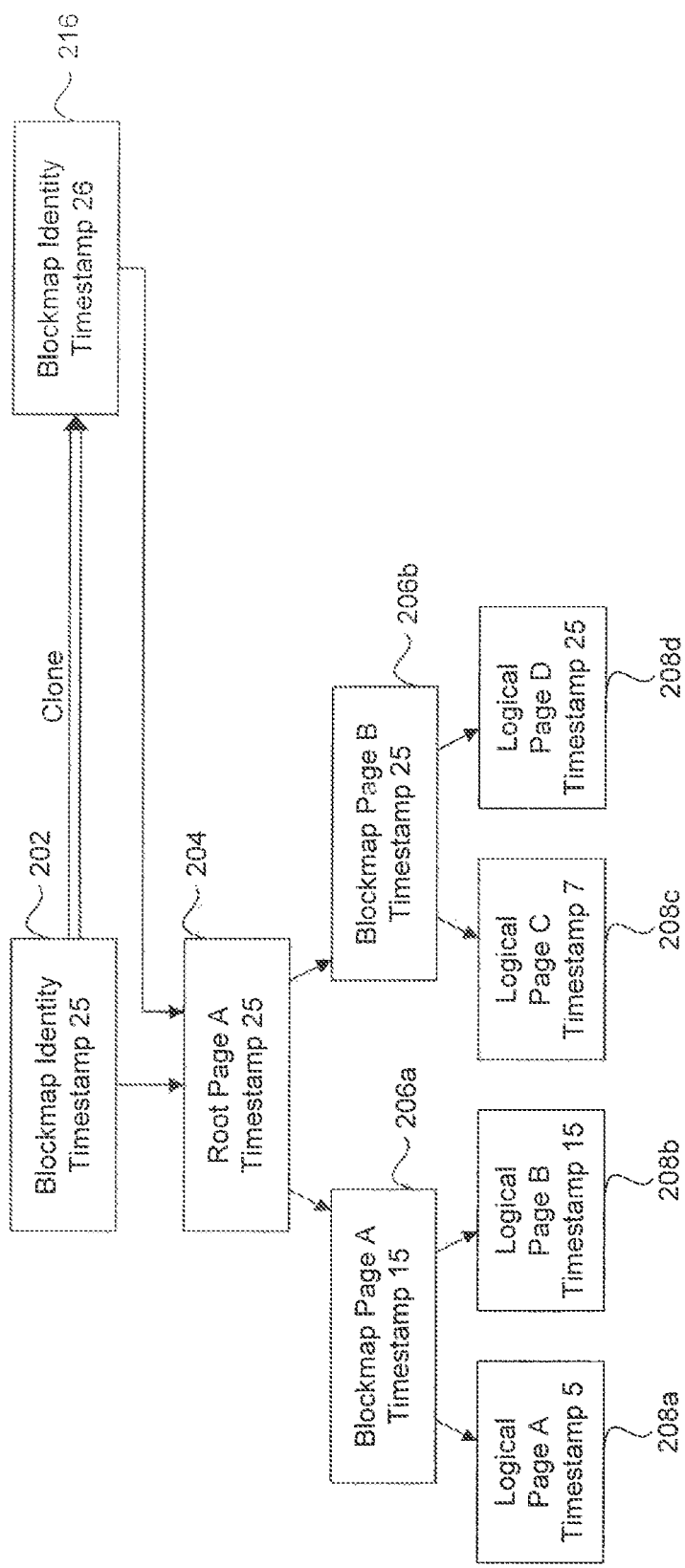

As illustrated in FIG. 2B, an embodiment creates new blockmap identity 216. New blockmap identity 216 includes pointers to the same root pages that blockmap identity 202 included, in this case a pointer to root pages 204. It should be noted that this is all occurring in the local cache of a node. When new blockmap identity 216 and the other data structures are written back to the shared disk database after the transaction commits, other nodes will have access to the new data and new structures.

Figure 2C:
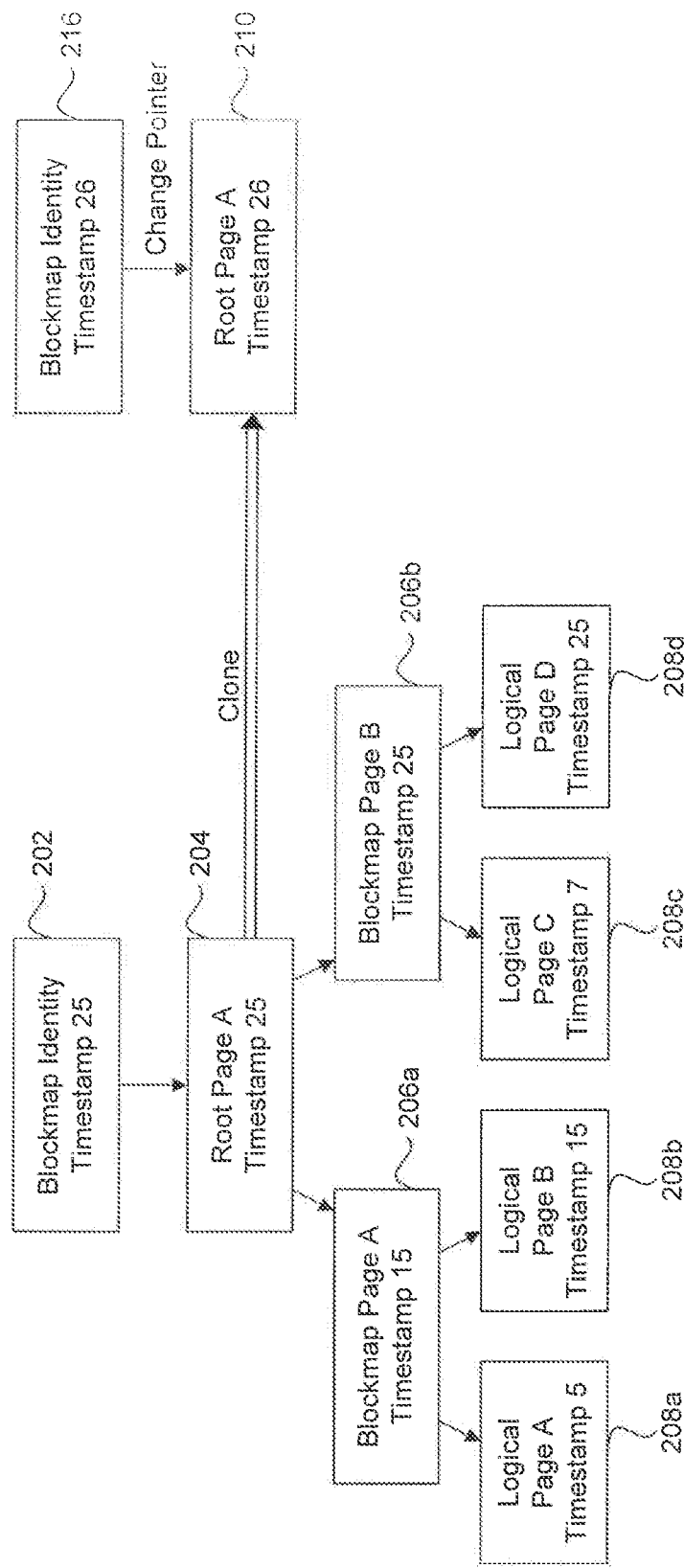

As illustrated in FIG. 2C, in an embodiment, a request to update logical page 208a of the blockmap is received. The embodiment clones root page 204 to create cloned root page 210. Because cloned root page 210 is a clone of root page 204, it will also include pointers to the same blockmap pages that root page 204 included, in this case pointers to blockmap pages 206a and 206b. Once cloned root page 210 is created, the new blockmap identity 216 can be modified to point to the cloned root page 210.

Figure 2D:
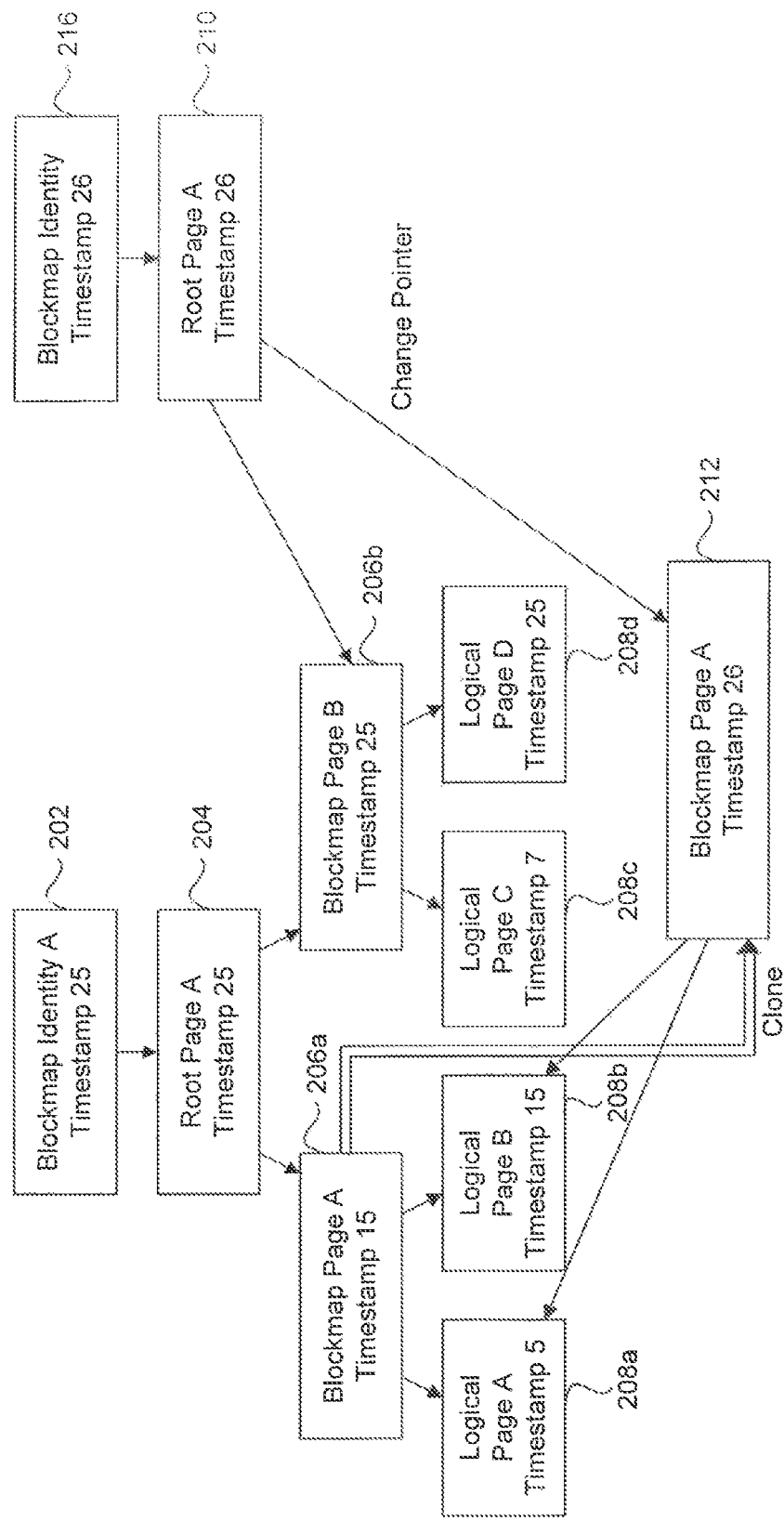

In an embodiment, after cloned root page 210 is created, the embodiment clones blockmap page 206a to create cloned blockmap page 212, as illustrated in FIG. 2D. Because cloned blockmap page 212 is a clone of blockmap page 206a, it will also include pointers to the same logical pages that blockmap page 206a included, in this case pointers to logical pages 208a and 208b. Once cloned blockmap page 212 is created, cloned root page 210 can be modified so that it no longer points to blockmap page 206a, but instead points to cloned blockmap page 212.

Figure 2E:
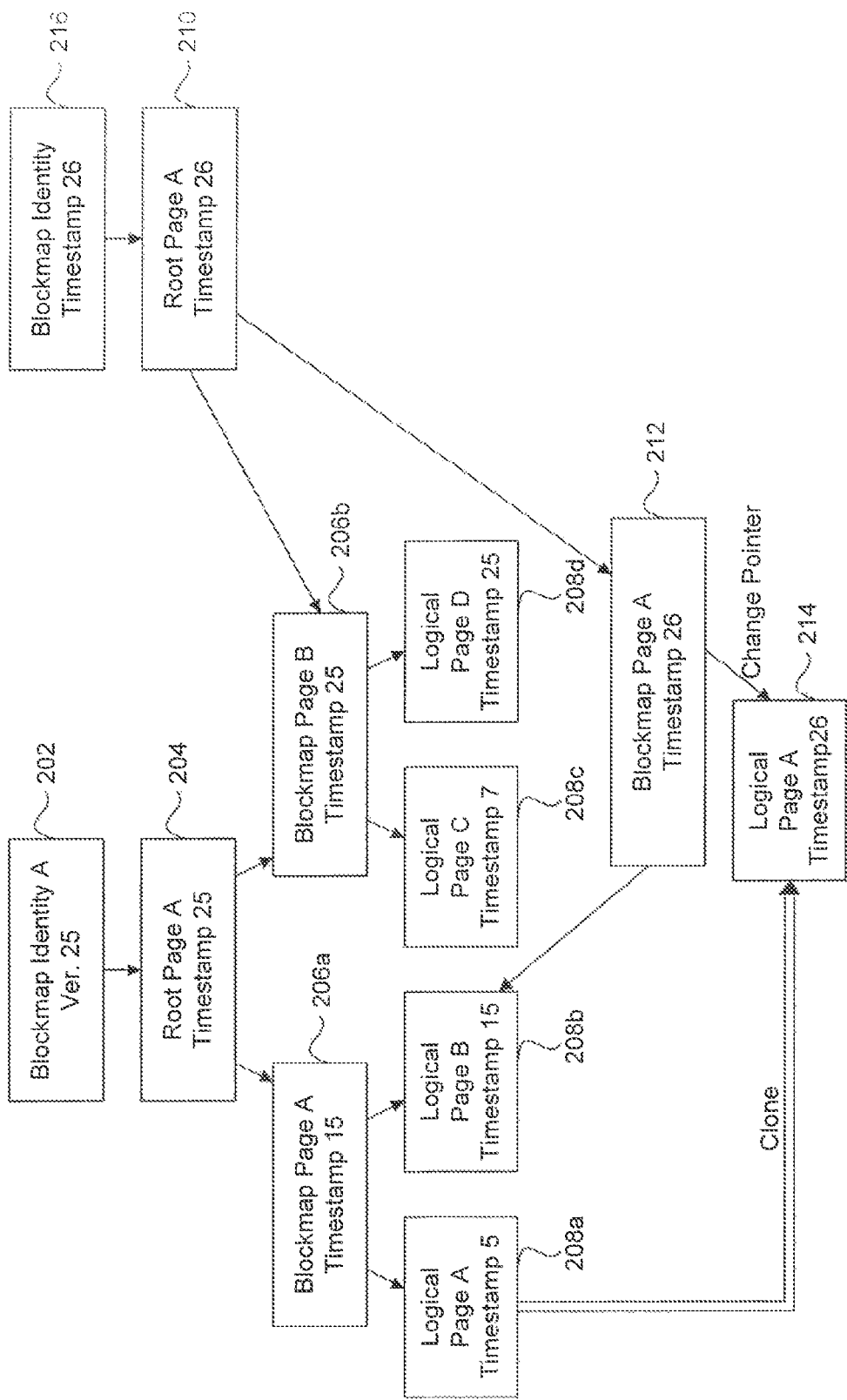

In an embodiment, after cloned blockmap page 212 is created and cloned root page 210 is modified, the embodiment clones logical page 208a to create cloned logical page 214, as illustrated in FIG. 2E. Because cloned logical page 214 is a clone of logical page 208a, it contains exactly the same data as the logical page 208a. Once cloned logical page 214 is created, cloned blockmap page 212 is modified so that it no longer points to logical page 208a, but instead points to cloned logical page 214.

Figure 2F:
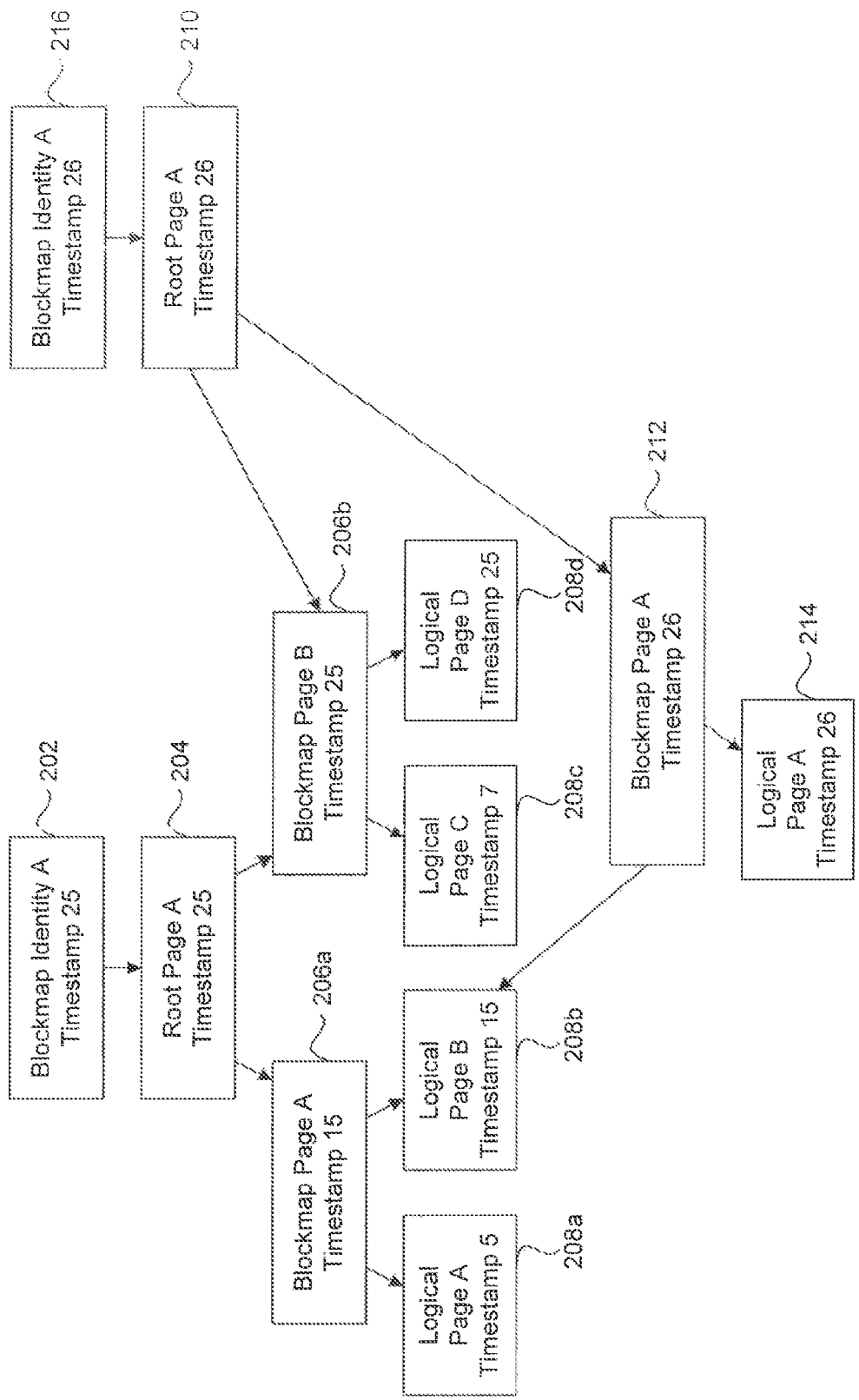

In an embodiment, after being created, the content of the cloned logical page 214 can be modified by the update transaction requested for the page, as illustrated in FIG. 2F. This update may be made on a local cache, for example any of local caches 104a-c in FIG. 1. All of these changes must now be committed to the database.

In an embodiment, requests can be received for updating the root or blockmap pages as well. A person skilled in the art would understand that all pages higher than the requested page must be cloned and modified as described above, but that all pages below the requested page can be left unchanged. For example, if a request came in to modify blockmap page 206a instead of logical page 208a, root page 204 and blockmap page 206a would be cloned and modified as described above, but logical page 208a would be left unchanged. The cloned blockmap page 212 would then point to the same logical pages as blockmap page 206a.

In an embodiment, the transaction that created and modified the new blockmap identity 216, cloned and updated root page 210, cloned and updated blockmap page 212, and cloned and updated logical page 214 is committed. In this embodiment, blockmap identity 216 is then written to the catalog. This ensures that blockmap identity 216 is not visible to others until it is ready to be used.

Illustration of Updating a Local Cache

Figure 3A:
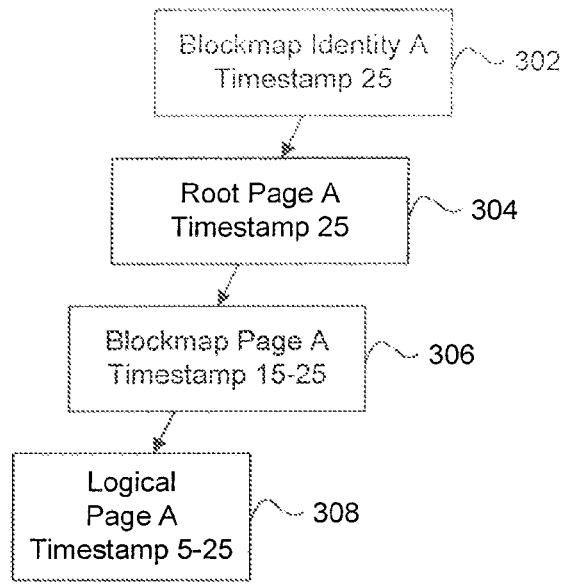
FIGS. 3A-3D are block diagrams of a cache in a shared disk database system as it is updated, according to an example embodiment.
Figure 3B:
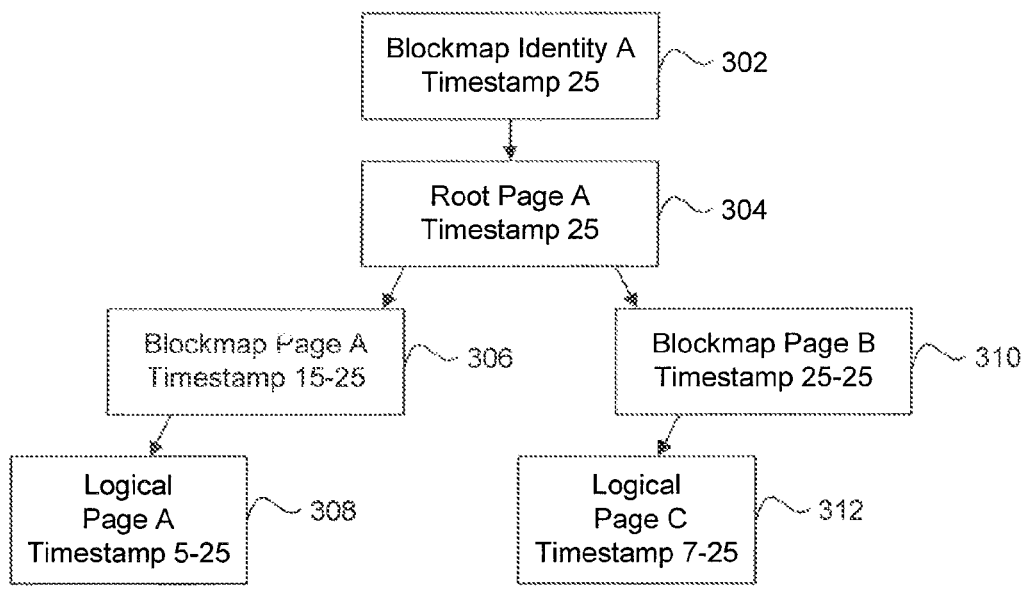
Figure 3C:
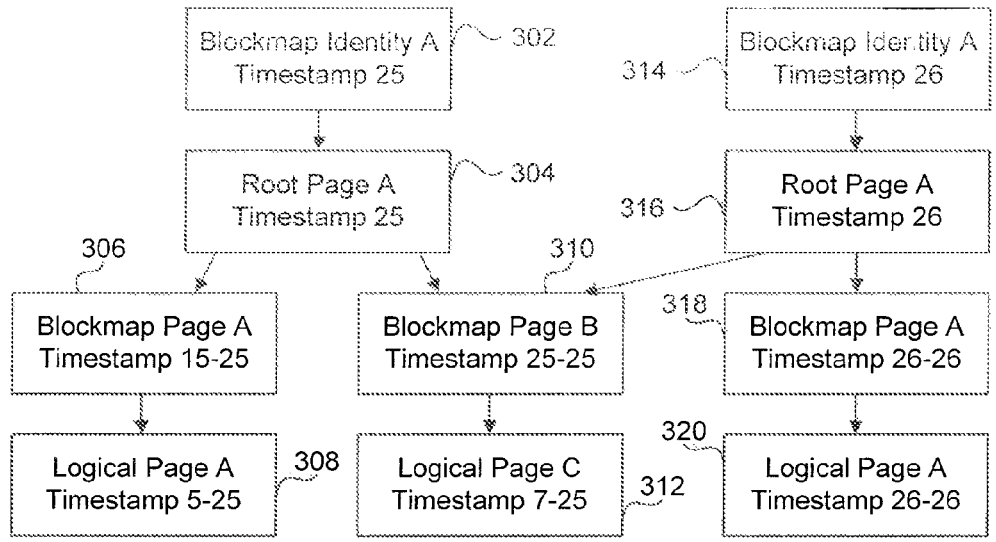
Figure 3D:
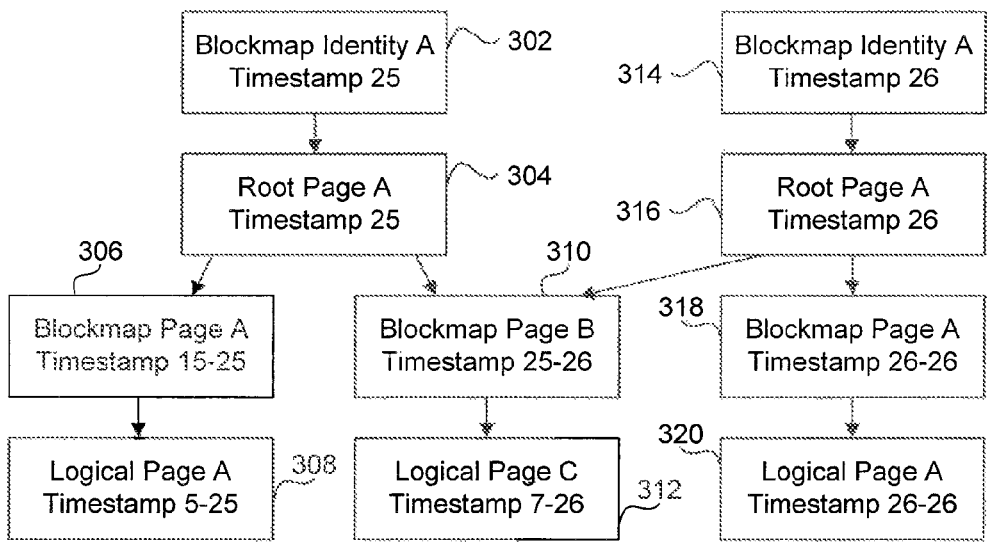

FIGS. 3A-3D are block diagrams of a local cache 300 in a shared disk database system as it is updated, according to an example embodiment. For ease of discussion of FIGS. 3A-3D, we will assume that the local cache 300 is connected to the database illustrated in FIG. 2F FIG. 3A illustrates an example, according to an embodiment, of the contents of local cache 300, for example any of local caches 104a-c, at some time after timestamp 25. FIG. 3B illustrates an example of how local cache 300 for this embodiment may appear if a request is made to read page C at timestamp 25. FIG. 3C illustrates an example of how local cache 300 for this embodiment may appear if a request is made to read page A at timestamp 26. Finally, FIG. 3D illustrates an example of how local cache 300 for this embodiment may appear if a request is made to read page C at timestamp 26.

At timestamp 25 data was stored to the database. At some point later, local cache 300 read the logical page as it existed at timestamp 25. At this point local cache 300, for example local cache 104b, may hold the data illustrated in FIG. 3A. As illustrated in FIG. 3A, local cache 300 may contain a blockmap identity A 302. In an embodiment, blockmap identity A 302 contains a blockmap unique identifier, a timestamp indicating when the blockmap was last updated, and a pointer to a root page's physical block number. In FIG. 3A, the timestamp indicated that blockmap identity A 302 was last updated at timestamp 25. Blockmap identity A 302 points to a root page A 304 at the physical block number. In an embodiment, the blockmap unique identifier and timestamp can be used to identify the root page that a blockmap identity points to. In FIG. 3A, the timestamp indicates that root page A 304 was created at timestamp 25.

In an embodiment, a cached root page can point to one or more cached blockmap pages, for example blockmap page A 306. In FIG. 3A, the timestamp range for blockmap page A 306 indicates that it is valid for any timestamp between timestamp 15 and 25. In an embodiment, a cached blockmap page can point to one or more cached logical pages, for example logical page A 308. In FIG. 3A, the timestamp range for logical page A 308 indicates that it is valid for any timestamp between timestamp 5 and 25.

In an embodiment, these ranges are created when a local cache tries to read a page. For example, if local cache 300 attempted to read logical page A as it existed at timestamp 25, it may not have been in cache. If not, it may have had to read it from a database, for example the database illustrated in FIG. 2F. When loading the logical page A associated with blockmap identity A at timestamp 25 (which will be discussed in further detail below), local cache 300 would have received a version of logical page A that indicates that it was created at timestamp 5. Thus, local cache 300 would know that this version of logical page A would be valid for all timestamps between 5 (when the logical page was created) and 25 (the timestamp of the read request).

In an embodiment, if local cache 300 wants to read logical page A as it existed at a timestamp in that range, for example timestamp 20, it can perform a fast lookup (to find the page in local cache) rather than performing a full lookup (walking the data structure to find the page). Local cache 300 can return the logical page A 308, knowing that it was valid for that time.

In an embodiment, as illustrated in FIG. 3B, local cache 300 attempts to read logical page C at timestamp 25. As illustrated in FIG. 3A, local cache 300 does not currently have a cached copy of logical page C. Local cache 300 does have a blockmap identity for the associated blockmap for timestamp 25, i.e., blockmap identity A 302. As illustrated in FIGS. 3A and 3B, blockmap identity A 302 point to root page A 304. Logical page C requires blockmap page B, which is currently not in local cache 300. Therefore, local cache 300 uses root page A 304 to determine the physical location of blockmap page B that is associated with logical page C and timestamp 25. Local cache 300 loads a copy of that blockmap page, i.e., blockmap page B 310.

Logical page C is currently not in local cache 300, as discussed above. Therefore, local cache 300 uses blockmap page B 310 to determine the physical location of logical page C that is associated with timestamp 25. Local cache 300 loads a copy of that logical page, i.e., logical page C 312. As discussed above, blockmap page B 310 and logical page C 312 also can be associated with timestamp ranges, in this case 25-25 and 7-25 respectively.

The node may then receive a request to read logical page A as it existed at timestamp 26. In an embodiment, as illustrated in FIG. 3C, the blockmap identity A 314 with timestamp 26 is first brought into local cache 300. A request is then made to read logical page A at timestamp 26 into local cache 300, using blockmap identity A 314. As discussed above and illustrated in FIGS. 2A-2F, logical page A was modified at time 26. Initially, local cache 300 uses a fast lookup to determine that it does not have a version of logical page A that is valid at timestamp 26. This is because, as show in FIG. 3C, logical page A 308 in local cache 300 is only valid for timestamps between 5 and 25.

Blockmap identity A 314 points to a root page A with timestamp 26. Because a version of root page a that is valid at timestamp 26 is not in memory, local cache 300 loads a copy of root page A from the database, i.e., root page A 316. Root page A 316 points to a version of blockmap page A that is valid at timestamp 26, and this is not the same version that is currently in local cache 300.

Therefore, local cache 300 loads the version of blockmap page A that is valid at timestamp 26 from the database, and stores it as blockmap page A 318. Similarly, local cache 300 loads the version of logical page A that is valid at timestamp 26, stored as logical page A 320. Because both blockmap page A 318 and logical page A 320 were created at timestamp 26 their lower timestamp bound is set to 26. Because both are being loaded in response to a request with timestamp 26, both of their upper bounds are set to 26 as well.

In an embodiment, as illustrated in FIG. 3D, a request is made to read logical page C at timestamp 26 into local cache 300, using the blockmap identity A 314. As can be seen in FIG. 2F, the root page for timestamp 26 points to the same blockmap page B that the root page for timestamp 25 does. While the blockmap and logical pages in local cache 300 are valid for timestamp 26, local cache 300 does not know this yet. Similar to the attempt to read logical page A at timestamp 26, local cache 300 attempts to find a version of logical page C that is valid at timestamp 26 using fast lookup, but does not find one. Similar to the above discussion of reading logical page C at timestamp 25, local cache finds the cached version of root page A 316, which is valid for timestamp 26. Root page A 316 points to the same blockmap page B as root page A 304. Therefore, local cache 300 uses blockmap page B 310. Because local cache 300 now knows that blockmap page B 310 is valid for timestamp 26, it updates the upper bound of blockmap page B 310, as illustrated in FIG. 3D, to be timestamp 26. Similarly, local cache 300 uses logical page C 312, and thus updates its upper bound.

Process for Updating Shared Data

Figure 4:
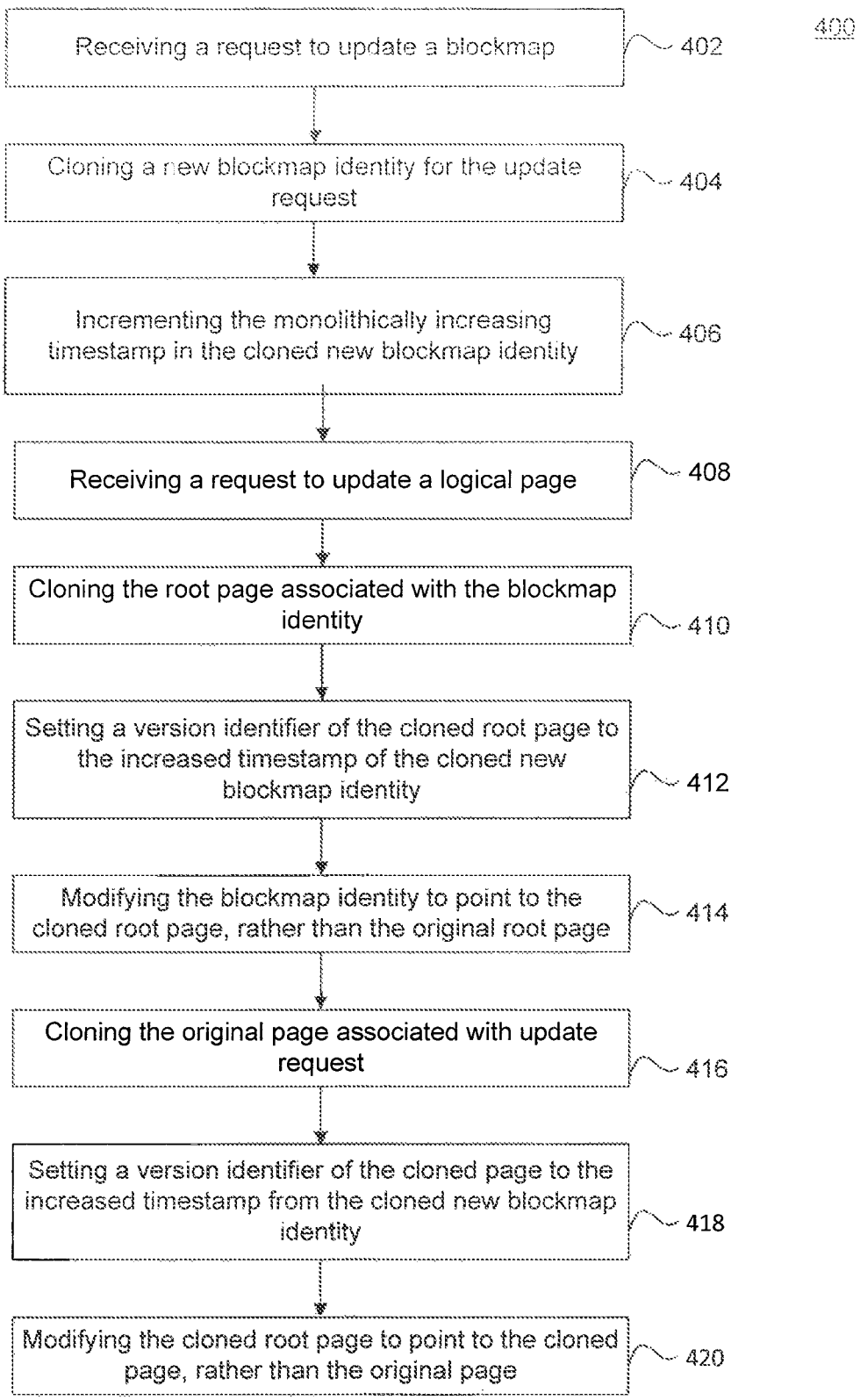
FIG. 4 is a flowchart illustrating a process for updating a page, according to an example embodiment.

FIG. 4 is a flowchart illustrating a process for updating a database, according to an example embodiment. FIG. 4 shows an example method for updating a database, for example database 102 in FIG. 1, with new data to allow access to both the new and old data depending on the timestamp of the request. After the local cache performs the update, the changes must be committed to the database so that other local caches can use the updated data.

In an embodiment, a cache receives a request to update a blockmap at step 402.

At step 404, a new copy of the blockmap identity is created. This new blockmap identity will be associated with the data as it exists in the blockmap identity at the point in time the requested modification is made.

At step 406, the timestamp of the new blockmap identity is updated. The timestamp is a monotonically increasing counter that tracks the number of times the blockmap is updated. In this manner, an update transaction uses a higher timestamp to create new version of pages in the blockmap and concurrent read requests can access pages of the blockmap as they existed at a specific point in time. This allows nodes to cache multiple versions of pages without synchronizing access to the blockmap. The timestamp can be stored using 4 bytes of data, allowing it to track a very large number of updates to the blockmap structure.

At step 408, a request to update a logical page in the blockmap is received.

At step 410, the root page associated with the blockmap to be updated is cloned. The original root page can now be used to access to the blockmap as it existed before the request for update, and the cloned root pointer can be used to access the blockmap for update. The cloned root page includes copies of the pointers to the next level of pages (either logical pages or blockmap pages) from the original root page. At this point, therefore, the clone will appear identical to the original root page.

At step 412, the version identifier for the cloned root page is updated. In an embodiment, this includes associating the timestamp for the cloned root page with the timestamp of the new blockmap identity. This allows the database and other applications to know when the cloned root page was created and modified.

At step 414, the blockmap identity is modified to include a pointer to the cloned root page.

At step 416, the logical page associated with the update request is cloned. This includes creating a copy of all of the data within the original logical page.

At step 418, the version identifier for the cloned logical page is modified to indicate it was created at the timestamp of the blockmap identity. As with the cloned root page, this allows the database and other application to know when the cloned logical page was created and modified.

At step 420, the cloned root page is updated to point to the cloned logical page, rather than the original logical page. At this point the cloned logical page can be updated by the transaction.

When the transaction completes all updates, the new blockmap identity is ready to be used by other applications (i.e., its pointers are correct and the data has been properly updated). In an embodiment the changes can be committed to the database at this point. Thus, the new blockmap identity can be used by other applications. It indicates at what point it is valid for any read requests, and includes pointers to updated pages, including the updated cloned logical page.

This flowchart describes how one logical page may be updated. In an embodiment a request may require more than one logical page to be updated. Cloning the logical page and updating the cloned root page to point to the cloned logical page can be repeated for each logical page that needs to be updated.

In addition, the flowchart illustrates a method of updating a logical page where there is only one level between the blockmap identity and the logical page, namely the root page level. A person skilled in the art would know that multiple additional levels can be included. Specifically, FIGS. 2A-2F illustrate an embodiment where one additional level exists, the blockmap page level. In embodiments that include additional levels, for example to due to the size of the database, at least one clone needs to be created on each level, pointing to the new information.

In an embodiment, the request can update a root page or other page in the structure. A person skilled in the art would understand how these pages could be updated and the structure modified, consistent with the description above.

Process for Reading Shared Data

Figure 5:
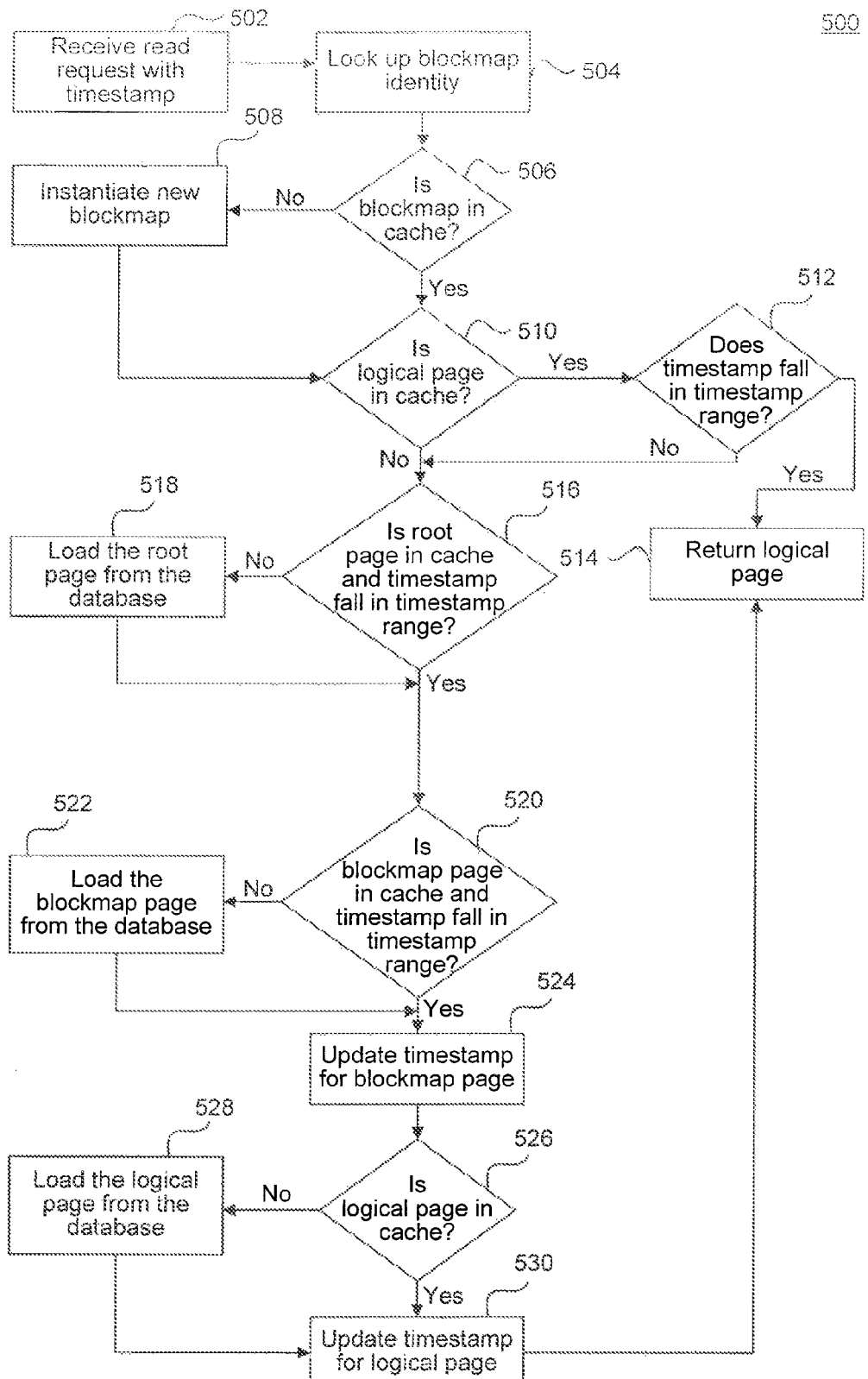
FIG. 5 is a flowchart illustrating a process for reading a page, according to an example embodiment.

FIG. 5 is a flowchart illustrating a process for reading pages and updating page timestamps in a cache, according to an example embodiment. FIG. 5 shows an example method for reading pages and updating page timestamps in a cache, for example any of local caches 104*a-c* in FIG. 1.

In an embodiment, a request for data located at a logical page is received at step 502. The request also includes the blockmap identity.

At step 504, the timestamp is retrieved from the blockmap identity by an embodiment. As discussed above, the blockmap identity includes a unique blockmap identifier, a timestamp, and a physical block number of a root page.

At step 506, an embodiment uses the unique blockmap identifier and the timestamp to determine if a blockmap for this request is in cache, for the appropriate timestamp. If not, execution continues to step 508, where a new blockmap is instantiated, and execution continues to step 510. If so, then execution skips straight to step 510.

At step 510, an embodiment performs a fast lookup to determine if there are one or more versions of the logical page for this request in the local cache. If not, execution continues to the multi-level lookup at step 516. If so, the fast lookup continues to step 512, determining if the timestamp of the request falls within the ranges of any of the versions of the logical page in the local cache. Again, if not, execution continues to step 516. But if one of the versions is valid for the timestamp of the request, execution continues to step 514, where the page or the data at the page for the request is returned.

Step 516 begins the multi-level lookup process. The local cache must now retrieve any pages needed to handle this request from the database, update any page timestamp ranges as necessary, and return the data requested.

At step 516, the process determines if a root page for this request is in the local cache. If not, at step 518, the root page for this request is loaded into cache. If this is a one level blockmap with root page only, then steps 520, 522, and 524 are not necessary. If this is a two level blockmap, then these steps must be executed once. If the data structure uses more levels, then these steps need to be executed for each level, other than the root level.

For each level, at step 520, the process determines if a page for that level that is valid for the requested timestamp, for example a blockmap page, is in cache. There may be a version of this page in cache that is valid for this timestamp or the parent page, for example the root page, may point to a version in the local cache. If the correct version is in memory, execution skips to step 526. If the parent page points to a version in local cache, the upper bound of the timestamp range for that blockmap page is updated in step 524, and execution continued at step 526. If not, at step 522, the correct version of the page, for example a blockmap page, is loaded into local cache from the database. At step 524, the timestamp range for the page is updated so that the lower bound is set to the timestamp when the page was created and the upper bound is set to the timestamp of the read request. Then execution continues to step 526.

The same is done for the logical page. At step 526, the process determines if the logical page is valid for the requested timestamp is in cache. If a version of the logical page is cached that is valid for this timestamp, execution continues to step 514. If not, the page pointed to by the parent page is checked to see if it is in cache. If so, the upper bound of the timestamp range for that version of the page can be updated in step 530, and execution continued at step 514. If not, then the correct version of the page must be loaded from the database. At step 528, the correct version of the logical page is loaded into local cache from the database. At step 530, the timestamp range for the logical page is updated so that the lower bound is set to the timestamp when the logical page was created, and the upper bound is set to the timestamp of the read request. And then execution continues to step 514.

As described above, at step 514 the page or the data at the page for the request is returned.

CONCLUSION

It is to be appreciated that the Detailed Description section, and not the Summary and Abstract sections (if any), is intended to be used to interpret the claims. The Summary and Abstract sections (if any) may set forth one or more, but not necessarily all, exemplary embodiments contemplated by the inventor(s), and thus are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method comprising:
   determining, in response to a data request associated with a timestamp, that a logical page associated with the data request and the timestamp is not present in a cache by determining that a blockmap identity associated with the time stamp is not present in the cache;
   retrieving, by a node, from a shared storage, the blockmap identity and a root page associated with the data request;
   retrieving, by the node, the logical page associated with the data request by copying a stored logical page from the shared storage to the cache; and
   indicating a range of valid timestamp values for the logical page with a lower timestamp value and an upper timestamp value, the indicating comprising setting the lower timestamp value of the logical page to a timestamp associated with the stored logical page, and setting the upper timestamp value of the logical page to the timestamp associated with the data request.

2. The method of claim 1, wherein the timestamp associated with the stored logical page and the timestamp associated with the data request are monotonically increasing timestamps.

3. The method of claim 1, wherein the timestamp associated with the stored logical page and the timestamp associated with the data request are 4 byte unsigned integers.

4. The method of claim 1, wherein the root page and the logical page comprise mappings of logical page numbers to physical block numbers.

5. The method of claim 1, wherein the determining that the logical page associated with the data request and the timestamp is not present in the cache further comprises determining that there is not a cached logical page matching the logical page in the data request where the timestamp of the data request falls within a timestamp range of the cached logical page.

6. The method of claim 1, wherein the determination that the logical page is not present in the cache further comprises the determination that the root page does not point to a cached logical page.

7. The method of claim 1, further comprising setting, by the node, an upper timestamp value of a cached logical page to the timestamp associated with the data request based on a determination that the root page points to the cached logical page and the upper timestamp value of the cached logical page is less than the timestamp associated with the data request.

8. The method of claim 1, further comprising:
   retrieving, by the node, a blockmap page associated with the data request by copying a stored blockmap page from the shared storage to the cache and setting a lower timestamp value of the blockmap page to a timestamp associated with the stored blockmap page and an upper timestamp value of the blockmap page to the timestamp associated with the data request, based on a determination that the blockmap page is not present in the cache.

9. A system comprising:
   a shared disk database; and
   at least one node coupled to the shared disk database and configured to:
   determining, in response to a data request associated with a timestamp, that a logical page associated with the data request and the timestamp is not present in a cache by determining that a blockmap identity associated with the time stamp is not present in the cache;
   retrieve, from a shared storage, the blockmap identity and a root page associated with the data request; and
   retrieve the logical page associated with the data request by copying a stored logical page from the shared storage to the cache; and
   indicate a range of valid timestamp values for the logical page with a lower timestamp value and an upper timestamp value, the indicating comprising setting the lower timestamp value of the logical page to a timestamp associated with the stored logical page, and setting the upper timestamp value of the logical page to the timestamp associated with the data request.

10. The system of claim 9, wherein the timestamp associated with the stored logical page and the timestamp associated with the data request are monotonically increasing timestamps.

11. The system of claim 9, wherein the timestamp associated with the stored logical page and the timestamp associated with the data request are 4 byte unsigned integers.

12. The system of claim 9, wherein the root page and the logical page comprise mappings of logical page numbers to physical block numbers.

13. The system of claim 9, wherein the determination that the logical page associated with the data request and the time stamp is not present in the cache further comprises the determination that there is not a cached logical page matching the logical page in the data request where the timestamp of the data request falls within a timestamp range of the cached logical page.

14. The system of claim 9, wherein the determination that the logical page is not present in the cache further comprises the determination that the root page does not point to a cached logical page.

15. The system of claim 9, wherein the node is further configured to set an upper timestamp value of a cached logical page to the timestamp associated with the data request based on a determination that the root page points to the cached logical page and the upper timestamp value of the cached logical page is less than the timestamp associated with the data request.

16. The system of claim 9, the node if further configured to:
retrieve a blockmap page associated with the data request by copying a stored blockmap page from the shared storage to the cache set a lower timestamp value of the blockmap page to a timestamp associated with the stored blockmap page and an upper timestamp value of the blockmap page to the timestamp associated with the data request, based on a determination that the blockmap page is not present in the cache.

17. A non-transitory computer-readable device having instructions stored thereon, execution of which, by at least one node, causes the one node to perform operations comprising:

determining, in response to a data request associated with a timestamp, that a logical page associated with the data request and the timestamp is not present in a cache by determining that a blockmap identity associated with the time stamp is not present in the cache;
retrieving, by a node, from a shared storage, the blockmap identity and a root page associated with the data request;
retrieving, by the node, the logical page associated with the data request by copying a stored logical page from the shared storage to the cache; and
indicating a range of valid timestamp values for the logical page with a lower timestamp value and an upper timestamp value, the indicating comprising setting the lower timestamp value of the logical page to a timestamp associated with the stored logical page, and setting the upper timestamp value of the logical page to the timestamp associated with the data request.

18. The computer-readable device of claim 17, wherein the timestamp associated with the stored logical page and the timestamp associated with the data request are monotonically increasing timestamps.

19. The computer-readable device of claim 17, wherein the timestamp associated with the stored logical page and the timestamp associated with the data request are 4 byte unsigned integers.

20. The computer-readable device of claim 17, wherein the instructions causes the one node to perform operations further comprising:
retrieving a blockmap page associated with the data request by copying a stored blockmap page from the shared storage to the cache and setting a lower timestamp value of the blockmap page to a timestamp associated with the stored blockmap page and an upper timestamp value of the blockmap page to the timestamp associated with the data request, based on a determination that the blockmap page is not present in the cache.

* * * * *